Oct. 13, 1936. E. DAVIS ET AL 2,057,513
WATER LEVEL CONTROL
Filed July 12, 1932 3 Sheets-Sheet 2
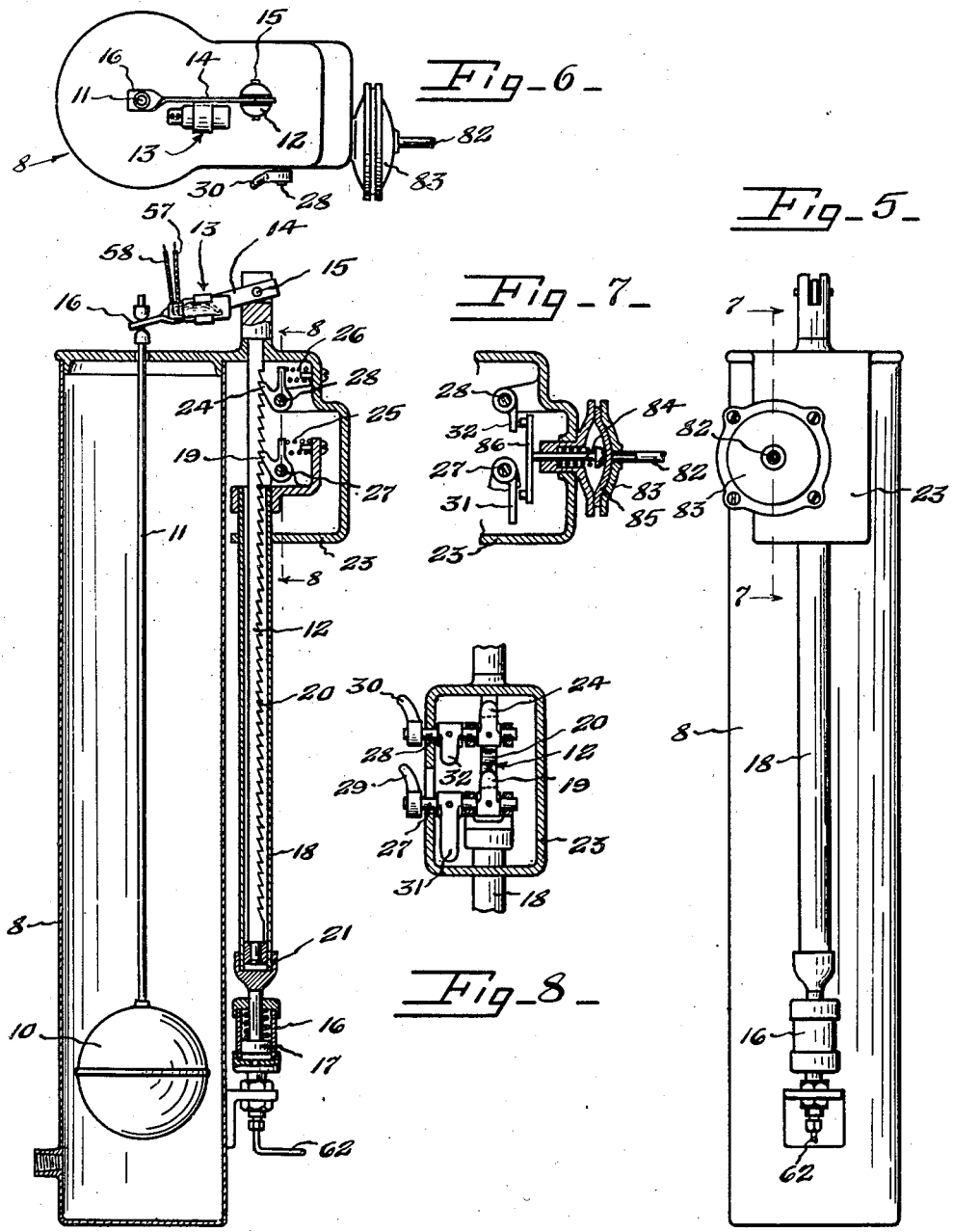

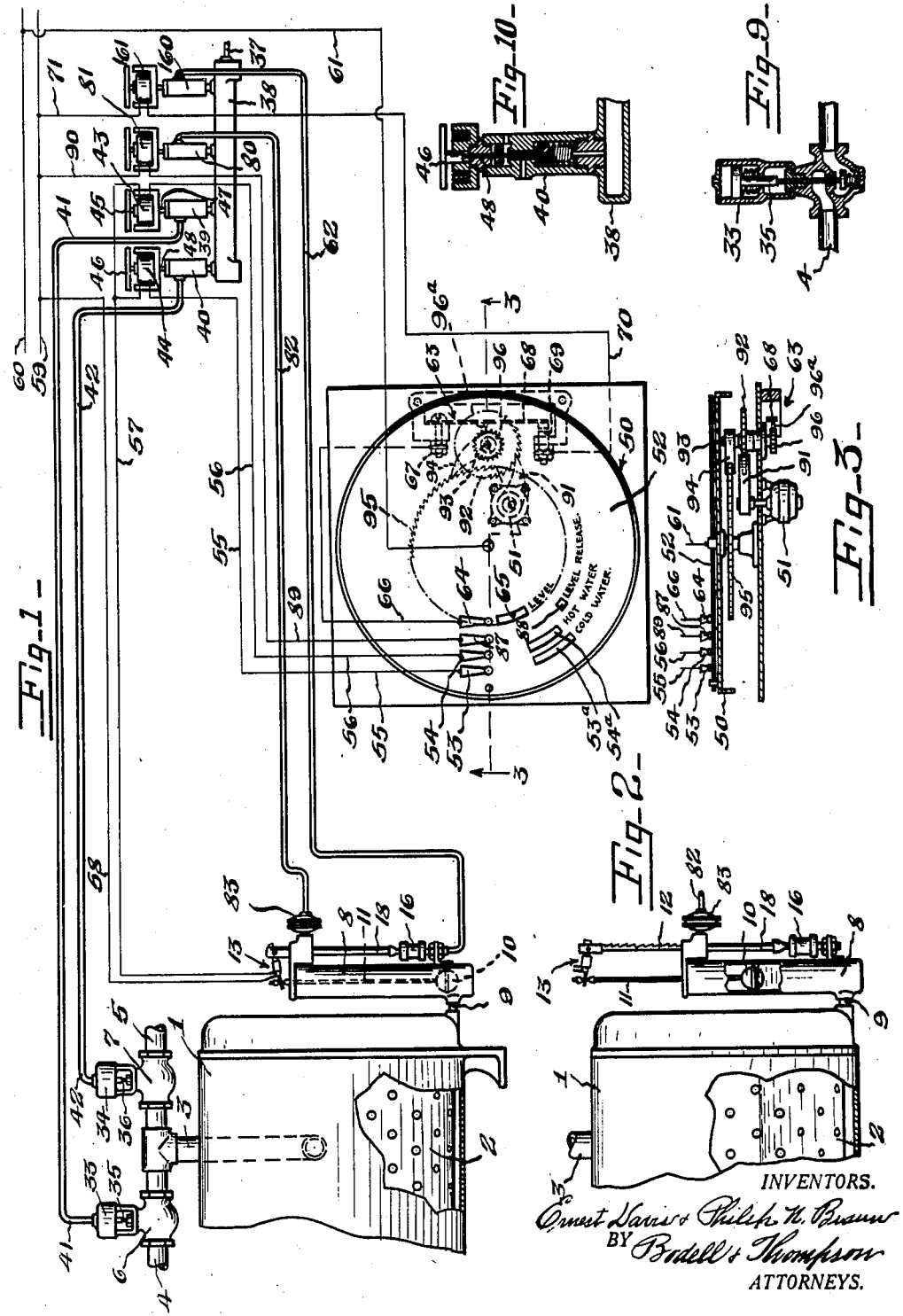

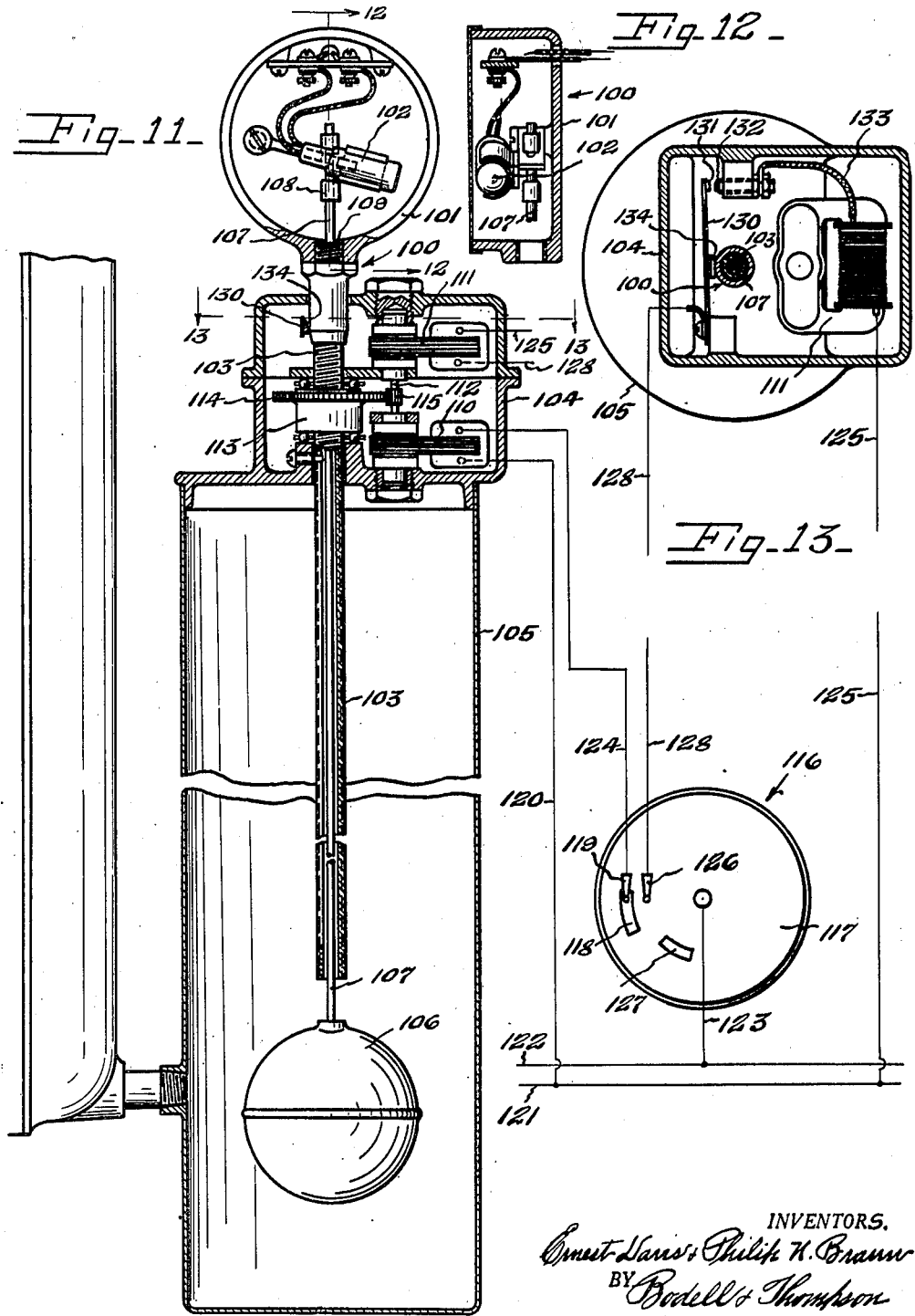

Patented Oct. 13, 1936

2,057,513

UNITED STATES PATENT OFFICE 2,057,513

WATER LEVEL CONTROL

Ernest Davis and Philip N. Braun, Syracuse, N. Y., assignors to The Prosperity Company Inc., Syracuse, N. Y., a corporation of New York Application July 12, 1932, Serial No. 622,098

23 Claims. (Cl. 137—68)

This invention relates to so-called water level controls for receptacles, or tanks, as for instance, the receptacles of commercial washing machines, and has for its object, a particularly simple and efficient means for operating the valves which control the flow of liquid into the receptacle, and particularly the shutting of the valve when the receptacle is filled to a predetermined level, and also particularly a presetting member for determining the predetermined level, and timed power means for automatically controlling the operation thereof.

It further has for its object, the presetting of a member which controls the water level, by a predetermined number of impulses imparted thereto by an actuator, and timed means for controlling the number of impulses of the actuator.

It further has for its object, a timer means for synchronizing the operation of the control means, or timer, which opens the valves for the liquid flowing into the receptacle with the control means, or timer, which controls the closing of the valves through the water level control.

The invention consists in the novel features and in the combinations and constructions hereinafter set forth and claimed.

In describing this invention, reference is had to the accompanying drawings in which like characters designate corresponding parts in all the views.

Figure 1 is a diagrammatic view showing, in fragmentary elevation, a commercial washing machine provided with this water level control, and showing the timer in plan.

Figure 2 is a fragmentary elevation of a washing machine showing the position of the water level control when the setting member is preset, and the control member has been operated by the float.

Figure 3 is a sectional view on line 3—3, Figure 1.

Figure 4 is an enlarged, vertical, sectional view through the float chamber and the presetting mechanism.

Figure 5 is an elevation looking to the left in Figure 4.

Figure 6 is a plan view of parts seen in Figure 4.

Figure 7 is a sectional view on line 7—7, Figure 5.

Figure 8 is a sectional view on line 8—8, Figure 4.

Figure 9 is a detail view of the hot or cold water valve.

Figure 10 is a detail view of one of the valves operated by the magnets which controls the flow of air.

Figure 11 is a view similar to Figure 4 of another embodiment of our invention.

Figure 12 is a sectional view on line 12—12, Figure 11.

Figure 13 is a sectional view on line 13—13, Figure 11.

We have here shown our invention as applied to a conventional commercial washing machine. A commercial laundry washer comprises a suitably supported body or receptacle having a main chamber in which a clothes container, drum or hydro-wheel is mounted and a chamber, as 8, in which is located a member, as a float, operated by the liquid or the level of the liquid in the receptacle, as for example, see Carroll Patent No. 1,639,368, issued August 16, 1927.

1 designates the receptacle, or cylinder, of a commercial washing machine having a chamber in which a drum or hydro-wheel is mounted and a float chamber 2 is the drum hydro-wheel or clothes receptacle mounted to move about an axis in one of the chambers of the receptacle.

3 designates an inlet pipe for a liquid to be used during the washing operation, as hot and cold water, this being connected to hot and cold water pipes 4, 5, having normally closed valves therein. 6 and 7 designate the casings of said valves. The valves are automatically opened by time controlled mechanism, as will be hereinafter set forth, and are closed, or controlled in the closing thereof, by the level of the water in the receptacle 1. The pipe communicates with the main chamber or drum chamber of the receptacle 1.

The closing of the valves, when a predetermined level is reached, is controlled by suitable means, the usual means being a float, this being here shown as located in the chamber 8 communicating with the receptacle 1 through a pipe 9, so that the level of the liquid is the same in the chamber 8 as in the receptacle 1. The chamber 8 is here shown as located outside of the receptacle 1, or as applied to the receptacle of a conventional laundry washing machine. The receptacle 1 and the chamber 8 constitute a receptacle means including a main portion provided with an intake for the liquid and a second portion in which the level control means operates, the two in effect being one liquid container.

10 designates the float in the chamber 8, this having an upwardly extending rod or stem 11 extending out through the top of the chamber 8. The construction thus far described per se, forms no part of this invention, and this invention relates to the water level control and the means for operating the presetting member to determine the level.

The water level control in addition to the float or means performing the function of a float, includes a presetting member 12 which is power actuated or controlled and the application of the power is timed. In the embodiment shown in Figures 1, 2, 4, and 5, the presetting member is intermittently movable, step by step, in steps of a predetermined length, the number of steps determining the level of the liquid in the receptacle 1. The presetting member is here shown as a vertically movable bar arranged at one side of the float chamber 8 and suitably guided in its movement, the presetting member carrying at its upper end, a control member, as a mercury switch 13, which is actuated by the rod 11 of the float when the predetermined level is reached.

The mercury switch 13 is here shown as carried by a cross head or carrier 14 movably or pivotally connected at 15 to the upper end of the presetting member 12, and also coupled at 16 to the upper end of the rod 11 of the float 10, so that when the presetting member is being set, it also lifts the float to the predetermined level in the float chamber 8, and when the level of the liquid in the receptacle 1, and chamber 8 rises to such a height that it buoys up the float, the support or cross head 14, which carries the mercury switch, will be tilted causing the mercury switch to break the circuit therethrough. The breaking of the circuit controls the closing of the valve 6 or 7.

The general idea of presetting the member 12 forms no part of this invention, but forms the subject matter of the patent of Philip N. Braun, No. 1,999,439, dated April 30, 1935.

This invention relates to the actuating means for the presetting member 12. This means comprises an intermittently movable actuator or motor means and preferably, a reciprocating actuator, that is, an actuator movable in reverse directions and motion transmitting means between the actuator and the presetting member to impart a step by step movement thereto, the motion transmitting means including a one-way clutch device which transfers the movement of a reciprocating actuator to the presetting member, but permits the return movement of the presetting member relatively to the actuator.

The actuator here illustrated comprises a cylinder 16 having a piston 17 therein; and the motion transmitting means comprises a part 18 movable lengthwise of the presetting member 12 and having a one-way clutch device, as a pawl 19, coacting with a rack 20 on the presetting member. This part 18 is here shown as a tube coupled at 21 to the piston rod, the tube enclosing the presetting member and being slidably guided in a housing, or hollow bracket 23 which encloses the clutch device, this housing being carried by the float chamber 8. The cylinder 16 and piston 17 constitute one form of motor means for presetting the member 12.

It is obvious that during upward movement of the tube 18 with the rod of the piston 17, the pawl 19 will, through the rack 20, push up the presetting member 12 an amount equal to the movement of the piston in the cylinder 16, and that the number of movements of the piston will determine the height the presetting member 12 is elevated and hence, the height the float becomes operative and the water level. Retrograde movement of the presetting member is normally prevented by a dog 24 in the housing 23 and coacting with the rack 20. The pawl 19 and the dog 24 are pressed into operative position by springs 25 and 26. The pawl 19 and dog 24 are mounted respectively on rock shafts 27 and 28 which extend outside of the housing 23, and are provided with handles 29 and 30 by means of which they can be manually operated in order to release the presetting member 12 by hand independently of the automatic means to be presently described. The rock shafts are also provided with additional arms 31 and 32 located in the housing 23 for a purpose to be presently described.

The valves within the casings 6, 7 normally held closed by springs, are power operated against the springs, and as here shown, they are operated by pistons located in cylinders 33 and 34 mounted adjacent the valves, the pistons having their stems 35 and 36 connected respectively to the stems of the valve members within the casings 6, 7. The motive fluid supplied to the cylinders 33 and 34 is preferably compressed air supplied from a supply pipe 37 to a header, or manifold 38 which communicates through valve casings 39 and 40, and pipes 41 and 42 with the cylinders 33 and 34 respectively, and the valves in the casings 39 and 40 are controlled in their operation by the mercury or control switch and by a timer, which controls the energizing of magnets 43 and 44 having armatures 45 and 46 which are connected to the stems 47 and 48 of the valves in the casings 39 and 40. When the magnet 43 is energized, the valve in the casing 39 will be opened, and the air will flow from the manifold 38, through the pipe 41, to the cylinder 33, causing the cold water valve 6 to open, and likewise, energizing of the magnet 44 will effect the opening of the valve in the casing 40 permitting air to flow from the manifold 38, through the pipe 42, to the cylinder 34, to open the hot water valve in the casing 7. The opening of the air valves is against returning springs and the construction of the valve within the casings 39 and 40 is such that when they are closed, the air is free to exhaust back through the pipes 41 and 42 to the outer air through the casings 39 and 40. The specific construction of the means for operating and controlling the operation of the valves forms no part of this invention, and as this construction is well known in the art, further description is thought to be unnecessary.

The circuit for the electromagnets 43 and 44 is controlled by the mercury switch 13, as will be hereinafter described. The energizing of the magnets is controlled by a timer here shown as a turn table 50 which is actuated by a time movement preferably including an electric motor 51, a formula sheet 52 on the timer and contacts 53, 54 bearing on the formula sheet and connected by wires 55 and 56 to the coils of the magnets 44 and 43 respectively, the coils being also connected by a wire 57 to one of the terminals of the mercury switch, the other terminal of which is connected by a wire 58 to one of the feed wires 59. The other feed wire 60 is connected by a wire 61 to the turn table which is a terminal. The formula sheet 52 is provided with slots 53a and 54a with which the contacts 53 and 54 register during the turning of the turn table. When either one or both of the contacts do register with the slots, a circuit to either or both of the magnets 44 and 43 is closed through the mercury switch 13, thus, causing one, or both, of the valves 6, 7 to be opened, and water to flow into the receptacle 1.

When the water reaches a predetermined level, it buoys up the float to tilt the arm 14 carrying the mercury switch 13 to break the circuit through the magnet, or magnets 44 and 43, so that the valve or valves close when the predetermined level is reached. The motive fluid, as air, is supplied to the cylinder 16 for actuating the presetting member from the manifold 38, through a valve in a casing 160, similar to the casings 39 and 40, and the valve in the casing 160 is controlled by a magnet 161, similar to the magnets 43 and 44. The air passes from the valve casing 160, through a pipe 62, to the cylinder 16, and the energization of the magnet 161 is controlled by a timer designated generally 63, which is synchronized with, or actuated by, the mechanism for the turn table 50, and is also controlled by a contact 64 which cooperates with a slot 65 in the formula sheet. This contact is connected by a wire 66 to a terminal 67 of the timer 63, which terminal is connected in circuit with a spring pressed contact 68 movable into and out of engagement with the terminal 69 which is connected by a wire 70 to the coil 161, this coil being connected to the feed wire 59 by a wire 71. The contact 68 of the timer 63 is intermittently actuated to open and close the circuit between it and the terminal 69 so as to intermittently energize and de-energize the magnet 161 while the contact 64 is in register with the slot 65. This effects the intermittent opening and closing of the valve 160 so that air can pass from the manifold 38, through the pipe 62, to the cylinder 16, and then when the contact 68 is separated from the terminal 69, the magnet 161 is again de-energized permitting the valve 160 to return to its normal position so that the air can exhaust from the piston 16, back through the pipe 62, to the outer air, through the casing 160 and the piston in the cylinder 16, and the part or tube 18 returns to its starting position for the next operation.

As the tube 18 and cylinder 16 are arranged in vertical position, the weight of the tube 18, the piston and the parts carried thereby, is sufficient to return them to their starting position when the air pressure is released in the cylinder 16. When the dump valve, not shown, of the washing receptacle 1 has been operated, this being operated by a slot in the formula sheet, and the water drained from the receptacle 1, the presetting member can be released if a different water level is desired for the next washing operation, and the releasing thereof in order to permit another presetting is controlled by the timer, or formula sheet. The release of the presetting member is effected by shifting the pawl 19 and dog 24 out of their operative positions, and the automatic release of this pawl and dog is controlled by the timer through a valve 80, similar to the valves 39, 40, and operated by a magnet 81, the valve casing being connected by a pipe 82 to the casing 83, having a piston or plunger 84 therein arranged to act upon the arms 31, 32 on the rock shafts 27, 28 respectively. The casing 83 is mounted upon the housing 23, and is a chamber having a diaphragm 85 therein which presses against one end of the plunger 84, the other end of which is provided with a head 86 coacting with the arms 31 and 32. The flow of current through the coils of the magnet 81 is controlled by a contact 87 coacting with the formula sheet and arranged to make contact with the turn table 50, through a slot 88 therein, the contact being connected by means of a wire 89 to the coils of the magnet 81, these coils being connected to the return feed wire, through wire 90.

It is obvious that when the contact 87 registers with the slot 88, the current will pass to the coils of the magnet 81 energizing said coils to open the valve in the casing 80, permitting air to flow through the pipe 82 to the diaphragm chamber 83, and thus through the plunger 84 rock the shafts 27, 28, to shift the pawl 19 and dog 24 out of engagement with the rack 20 and thus permit the presetting member to move by gravity to its lowermost position from which it can be again reset, either manually or automatically, as heretofore explained. The cylinder 16 and the piston 17 therein, and the diaphragm 85 and parts operated by the diaphragm constitute one form of motor means for controlling the setting of the presetting member and the return of the presetting member to its starting position. The motor means is controlled by the timer or turn table 50 which is actuated by the motor 51, the cylinder and piston effecting the actuation of the presetting member to preset it and the diaphragm controlling the return of the presetting member to its starting position.

The formula sheet is formed with slots and the timer with contacts sufficient to control most or all of the washing operations. However, as the invention relates to the water level control, the formula sheet is shown as provided with only the slots necessary, and the timer with only the contacts necessary, to perform the water level operation.

The turn table is actuated from the motor 51 through any suitable transmitting mechanism. That here shown is illustrative only and comprises a pawl 91 eccentrically mounted on the shaft of the motor 51, so that during rotation of the shaft, the pawl will actuate a ratchet wheel 92 mounted on a shaft 93 with which wheel the pawl coacts, a second pawl 94 eccentrically mounted on the shaft 93 so that during the rotation of the shaft, the pawl 94 is reciprocated, this pawl coacting with the ratchet wheel 95 rigid with the turn table. Thus, during rotation of the motor, forward impulses are imparted to the turn table in short steps. The motor is run at a predetermined speed, so that the rotation of the turn table is timed. The timer 63 in synchronized with the turn table, or the actuating mechanism therefor, and is also actuated from the motor, but is only in effective operation when the contact 64 is in register with the slot 65. When the contact 64 is in register with the slot 65, the circuit is closed by the contact 68 through the magnet 161, which controls the valve 160, which in turn controls the actuation of the piston in the cylinder 16 only when the contact 68 is in engagement with the terminal 69. The contact 68 is spring pressed, or resilient, so that it tends to make contact with the terminal 69, but the circuit controlled thereby is intermittently broken, and as here shown, it is broken by a cam wheel 96 on the shaft 93 and coacting with a follower 96ª on the contact 68. Thus, the circuit through the magnet 161 is intermittently broken, and the number of reciprocations of the piston in the cylinder 16 and hence, the height to which the presetting member 12 is elevated, is accurately determined. Or, in other words, a predetermined number of impulses will be given while the contact 64 is in register with the slot 65.

In the form shown in Figure 11, the presetting member 100 is shown as consisting of a head or casing 101 in which the control member or tilting mercury switch 102 is mounted and a threaded stem 103 extending downwardly through a housing 104 and into the float chamber 105, the stem being slidably mounted in the housing 104 and held in any suitable manner from rotary movement. The float 106 in the float chamber 105 has its rod 107 extending upwardly through the threaded stem 103 and connected at its upper end to the tilting mercury switch to tilt the same and break the circuit controlled thereby when the float is buoyed up to a predetermined extent dependent upon the height to which the presetting member has been adjusted.

In this embodiment of our invention, the float is also lifted upwardly with the presetting member, when the presetting member is being set and is coupled thereto by a lost motion connection sufficient to permit the float and its rod to rise relatively to the presetting member and hence tilt the mercury switch when the fluid level rises to a predetermined amount dependent upon the setting of the presetting member. As here shown, the rod 107 of the float is formed with a shoulder 108 which normally engages a shoulder 109 at the upper end of the stem, when the presetting member is being preset, and moves away from said shoulder 109 to operate the control member or mercury switch 102 when the float is buoyed up by the level of the fluid in the float chamber 105.

The motor means for operating the presetting member is here illustrated as a reversible rotary electric motor, and here shown as including two units 110, 111 located in the housing 104 and having a shaft 112 in common. The motion transmitting means between the motor means and the stem 103 includes a nut device 113 on the stem and located in the casing 104, this having a gear wheel 114 which meshes with the pinion 115 on the motor shaft 112. The nut 113 is held from endwise movement in the casing 104 by suitable thrust bearings. The motor units 110, 111 are reversely wound and the unit 110 effects the presetting of the presetting member at a predetermined level dependent on the length of time the unit 110 is energized and the unit 111 controls the return of the presetting member to its starting position. The energizing of the units is controlled by a timer 116 of any suitable construction and of the same type as that shown in Figures 1 and 3. It includes a formula sheet 117 on a turn table, the formula sheet being provided with slots through which contacts can engage the turn table, which is a terminal. 118 designates the slot for controlling the energization of motor unit 110, this coacting with a contact 119. The windings of the motor unit 110 are connected by a wire 120 to one of the feed wires 121. The other feed wire 122 is connected to the turn table by a wire 123 and the circuit is completed to the motor through the contact 119 when it is in register with the slot 118 by a wire 124. Thus, the motor unit 110 will operate as long as the contact 119 is in register with the slot 118 and while it is in register with the slot, the presetting member 100 will be moved upwardly to a predetermined height dependent on the length of the slot 118, the rotation of the turn table being timed, as in Figure 1. As the liquid rises in the float chamber, it will buoy up the float 106 moving the rod 107 upwardly causing the rod to tilt the mercury switch and break the circuit therethrough, as in Figures 1 and 2, and thus close the valve that is open, as in Figures 1 and 2.

When the liquid is drained out of the receptacle 2, and hence out of the float chamber 105 by the opening of the dump valve and another liquid level is desired for the next operation, the presetting member is returned to its starting position and is returned by its control, the return of the presetting member being effected by the motor unit 111. This motor unit 111 performs the same function as the diaphragm 85. The windings of the motor unit 111 are connected to the feed wire 121 by conductor 125 and the other feed wire 122 is connected to the motor through the wire 123, the turn table of the timer, contact 126, when this contact registers with a slot, as 127, in the formula sheet, thence through wire 128 to the windings of the motor unit 111. As the presetting member's movement varies in accordance with the height at which it has been reset, the slot 127 is made long enough to insure the complete return of the presetting member to its starting position, and means is provided controlled by the return movement of the presetting member itself for breaking the circuit through the motor unit 111. This means is here shown as a normally closed switch 130 connected in circuit with the wire 128 and having a contact 131 normally in engagement with a contact 132, the switch 130 and its contact being located in the housing 104. The contact 132 is connected by a wire 133 to the windings of the motor. Just before the presetting member reaches its return position, the switch 130 is opened by a projection or cam 134 on the presetting member. It is obvious that when the presetting member is actuated to be preset by the motor unit 110, this projection 134 will pass out of engagement with the switch arm 130 and permit the circuit to be closed at this point. In either embodiment of our invention, the presetting member is preset by motor means in one direction, and reset in its starting position or controlled in its resetting by motor means, and the operation of the motor means is controlled by the timer.

In the general operation, assuming that the receptacle 1 is empty, either one or both of the valves in the casings 6, 7, are opened when the contacts 53, 54, register with one or both of the slots 53ª, 54ª of the formula sheet. During the same time, or at some time while the water is filling into the receptacle 1, the contact 64 registers with the slot 65, thus controlling the operation of the presetting member 12 to a predetermined level, this level being dependent upon the length of the slot 65. When the water fills up to the float which, as here illustrated, is lifted upwardly with the presetting member, and buoys up the float, the relative movement of the float to the presetting member effects a tilting of the mercury switch 13 to break the circuit through the magnet 43 or 44 or both, which control valves in the casings 39 and 40, which in turn control the hot and cold water valves in the casings 6, 7.

When the mercury switch so tilts the hot and cold water valves will close. When the water from the washing machine is dumped, and a new level is desired, the contact 87 registers with the slot 88, thus energizing the magnet 81, so that the valve in the casing 80 is opened to permit air to flow to the diaphragm chamber 83 and release the pawl 19 and dog 24, permitting the presetting member under the influence of its own weight, and the weight of the float, to return to their starting position preparatory to a new resetting.

Owing to the intermittent, measured, and timed actuation of the presetting member by the cylinder and piston, the presetting member can be quickly and accurately set.

The presetting member can be set at any time by merely lifting it upwardly, and also released manually by operating the handles 29 and 30.

What we claim is:

1. A control for the level of the liquid in a receptacle having an intake conduit and valve therein, said control including a presetting member, motor means for presetting said member, motion transmitting connections between the motor means and the presetting member, a control element carried by the presetting member for controlling the closing of the valve, and timed means for controlling the operation of the motor means, in combination with means operated by the level of the liquid in the receptacle to operate the control element.

2. A control for the level of the liquid in a receptacle having an intake conduit and valve therein, said control including a presetting member, motor means for presetting said member, motion transmitting connections between the motor means and the presetting member, a control element carried by the presetting member for controlling the closing of the valve, timed means for controlling the operation of the motor means, and motor means for controlling the return of the presetting member to its starting position, in combination with means operated by the level of the liquid in the receptacle to operate the control element.

3. A control for the level of the liquid in a receptacle having an intake conduit and valve therein, said control including an oppositely movable presetting member movable from a starting position to a set position and also having a movement in the reverse direction to its starting position, a control element carried thereby for controlling the closing of the valve, motor means for actuating the presetting member from its starting position and timed means for controlling the operation of the motor means, in combination with means operated by the level of the liquid in the receptacle when at a predetermined level to operate the control element.

4. A control for the level of the liquid in a receptacle having an intake conduit and a valve therein, said control including an oppositely movable presetting member movable from a starting position to a set position and also having a movement in the reverse direction to its starting position, a control element carried thereby for controlling the closing of the valve, motor means for actuating the presetting member from its starting position, timed means for controlling the operation of the motor means, and timed motor means for controlling the return of the presetting member to its starting position, in combination with means operated by the level of the liquid in the receptacle when at a predetermined level to operate the control element.

5. A control for the level of the liquid in a receptacle having an intake conduit and a valve therein, said control including a presetting member, the presetting member being movable in one direction from starting position to a preset position and in the reverse direction to starting position, a control element carried by the presetting member for controlling the closing of the valve, motor means for controlling the operation of the presetting member, timed means for controlling the operation of the motor means to actuate the presetting member, in combination with means operated by the level of the liquid in the receptacle when at a predetermined level to operate the control element.

6. A control for the level of the liquid in a receptacle having an intake conduit and a valve therein, said control including a presetting member having a non-rotatable threaded stem, a rotatable nut on said stem and held from endwise movement, a control element carried by the presetting member for controlling the closing of the valve, motor means for turning the nut and a timed means for controlling the operation of the motor means, in combination with means operated by the level of the liquid in the receptacle when at a predetermined level to operate the control element.

7. A control for the level of liquid in a receptacle means including one portion having an intake conduit and a valve therein, and a second portion, said control including means controlled by the level of the liquid in the receptacle means, a presetting member having a hollow stem depending into the liquid in the second portion, said means controlled by the level of the liquid having a rod extending through the stem, a control element carried by the stem for controlling the closing of the valve and arranged to be operated by the rod when said means controlled by the level of the liquid is moved a predetermined distance by the level of the liquid, motor means for actuating the presetting member, motion transmitting means between the motor and the stem of the presetting member, and timed means for controlling the operation of the motor means.

8. A control for the level of liquid in a receptacle having an intake conduit and a valve therein, said control including means controlled by the level of the liquid in the receptacle, a presetting member having a hollow stem depending into the liquid, said means having a rod extending through the stem, a control element carried by the presetting member for controlling the closing of the valve and arranged to be actuated by the rod, when said means is moved a predetermined distance by the level of the liquid, motor means for actuating the presetting member, motion transmitting means between the motor and the stem of the presetting member, the stem being threaded and the motion transmitting means including a rotatable nut on the threaded stem held from endwise movement, and timed means operating to control the motor means to rotate the nut in opposite directions at predetermined intervals.

9. A control for the level of the liquid in a receptacle having an intake conduit and valve therein, said control including a presetting member, a control element carried thereby for controlling the closing of the valve, means for presetting said member step by step including an intermittently movable actuator, connections between the actuator and the presetting member, and means for controlling the number of movements of the actuator, in combination with means operated by the level of the liquid in the receptacle, and connections operated thereby to operate the control element.

10. A control for the level of liquid in a receptacle having an intake conduit and valve therein, said control including a rectilinearly movable presetting member, a control element carried thereby for controlling the closing of the valve, an intermittently movable actuator for moving said member in one direction, and means for controlling the number of movements of the actuator, in combination with means operated by the level of the liquid in the receptacle, and connections operated thereby to operate the control element.

11. A control for the level of a liquid in a receptacle having an intake conduit and valve therein, said control including a rectilinearly movable presetting member, a control element carried thereby for controlling the closing of the valve, an intermittently operable actuator, and means for controlling the number of intermittent movements of the actuator, in combination with means operated by the level of the liquid in the receptacle and connections operated thereby to operate the control element.

12. A control for the level of a liquid in a receptacle having an intake conduit and valve therein, said control including a rectilinearly movable presetting member, a control element carried thereby for controlling the closing of the valve, an actuator for operating said member step by step in one direction, said actuator including a cylinder and piston, a one-way coupling device for coupling the piston to the actuator during the power stroke thereof and permitting the return of the piston relatively to the presetting member and releasable means for holding the presetting member from return movement, in combination with means operated by the level of the liquid in the receptacle, and connections operated thereby to operate the control element.

13. A control for the level of a liquid in a receptacle having an intake conduit and valve therein, said control including a rectilinearly movable presetting member, a control element carried thereby for controlling the closing of the valve, an actuator for operating said member step by step in one direction, said actuator including a cylinder and piston, a one-way coupling device for coupling the piston to the actuator during the power stroke thereof and permitting the return of the piston relatively to the presetting member, releasable means for holding the presetting member from return movement, in combination with means operated by the level of the liquid in the receptacle, connections operated thereby to operate the control element, and timed means for controlling the number of reciprocations of the piston.

14. A control for the level of a liquid in a receptacle having an intake conduit and valve therein, said control including a vertically movable presetting member, an intermittently movable actuator, motion transmitting means between the actuator and the presetting member, and means for controlling the number of intermittent movements of the actuator, in combination with means operated by the level of the liquid in the receptacle and connections operated thereby to control the closing of the valve in the intake conduit.

15. A control for the level of a liquid in a receptacle having an intake conduit and valve therein, said control including a vertically movable presetting member, a reciprocating actuator for operating said member step by step in one direction, motion transmitting means between the actuator and the presetting member including a one-way coupling device for permitting retrograde movement of the actuator relatively to the presetting member, releasable means for holding the presetting member from retrograde movement, and means for controlling the number of reciprocations of the actuator; in combination with means acted upon by the level of the liquid in the receptacle and including an element preset by the presetting member at a predetermined level for controlling the closing of said valve.

16. A control for the level of a liquid in a receptacle having an intake conduit and valve therein, said control including a vertically movable presetting member, a control element carried thereby for controlling the closing of the valve, a reciprocating actuator for operating said member step by step in one direction, motion transmitting means between the actuator and the presetting member including a one-way coupling device for permitting retrograde movement of the actuator relatively to the presetting member, means for holding the presetting member from retrograde movement, means for controlling the number of reciprocations of the actuator, and means for releasing the holding means and the one-way clutch device from the presetting member to permit it to return to starting position relatively to the actuator, in combination with means operated by the level of the liquid in the receptacle and connections operated thereby to operate the control element.

17. A control for the level of a liquid in a receptacle, said control including a rectilinearly movable presetting member, an actuator for operating said member step by step in one direction including a cylinder and piston in line with the presetting member, a motion transmitting part connected to the piston and extending lengthwise of the presetting member, a one-way clutch between the motion transmitting part and the presetting member, and releasable means for preventing retrograde movement of the presetting member; in combination with means acted upon by the level of the liquid in the receptacle and including an element preset by the presetting member at a predetermined level for controlling the closing of said valve.

18. A control for the level of a liquid in a receptacle, said control including a rectilinearly movable presetting member, an actuator for operating said member step by step in one direction including a cylinder and piston in line with the presetting member, a motion transmitting part connected to the piston and extending lengthwise of the presetting member, a one-way clutch between the motion transmitting part and the presetting member, means for preventing retrograde movement of the presetting member, and means for releasing the one-way clutch device and the holding means to permit the presetting member to move in a retrograde direction relatively to the actuator; in combination with means acted upon by the level of the liquid in the receptacle and including an element preset by the presetting member at a predetermined level for controlling the closing of said valve.

19. A control for the level of a liquid in a receptacle having an intake conduit and a valve therein, said control including a presetting member, motor means for presetting said member, motion transmitting connections between the motor means and the presetting member, a control element for controlling the closing of the valve and means for controlling the operation of the motor means, in combination with means operated by the level of the liquid in the receptacle and a connecting member operated by last mentioned means, said control element being carried by one of said members and coacting with the other.

20. A control for the level of a liquid in a receptacle having an intake conduit and a valve therein, said control including a presetting member, motor means for presetting said member, motion transmitting connections between the motor means and the presetting member, a control element for controlling the closing of the valve, timed means for controlling the operation of the motor means, and for controlling the return of the presetting member to its starting position in combination with means operated by the level of the liquid in the receptacle and a connecting member operated thereby, said control element being carried by one of said members and coacting with the other.

21. A control for the level of the liquid in a receptacle having an intake conduit and a valve therein, said control including a rectilinear movable presetting member movable from a starting position to a set position and also having a movement in the reverse direction to the starting position, a control element for controlling the closing of the valve, motor means for actuating the presetting member from its starting position, and timed means for controlling the operation of the motor means, and the return of the presetting member to its starting position, in combination with means operated by the level of the liquid in the receptacle and a connecting member operated thereby, the control element being carried by one of said members and coacting with the other.

22. A control for the level of the liquid in a receptacle having an intake conduit and a valve therein, said control including a presetting member having a threaded stem, a rotatable nut on said stem and held from endwise movement, a control element for controlling the closing of the valve, motor means for turning the nut, and means for controlling the operation of the motor means, in combination with means operated by the level of the liquid in the receptacle, and a connecting member operated thereby, said control element being carried by one of said members and coacting with the other.

23. A control for the level of the liquid in a receptacle having an intake conduit and a valve therein, said control including a presetting member, a rotatable actuator therefor, a control element for controlling the closing of the valve, motor means for turning the actuator, the actuator and the presetting member having coacting means whereby the presetting member is shifted to a preset position by the rotation of the actuator, and means for controlling the operation of the motor means, in combination with means operated by the level of the liquid in the receptacle and a connecting member operated thereby, said control element being carried by one of said members and coacting with the other.

ERNEST DAVIS.
PHILIP N. BRAUN.